United States Patent
Duchene et al.

(10) Patent No.: US 6,832,768 B2
(45) Date of Patent: Dec. 21, 2004

(54) SHOPPING CART HAVING CUPHOLDER IN SEAT BASE

(75) Inventors: Val-Jean Duchene, Wagoner, OK (US); Taft O'Quin, Inola, OK (US)

(73) Assignee: Unarco Industries, Inc., Wagoner, OK (US)

( * ) Notice: Subject to any disclaimer, the term of this patent is extended or adjusted under 35 U.S.C. 154(b) by 136 days.

(21) Appl. No.: 10/292,188

(22) Filed: Nov. 12, 2002

(65) Prior Publication Data

US 2004/0090024 A1 May 13, 2004

(51) Int. Cl.$^7$ ............................................. B62D 39/00
(52) U.S. Cl. ........................... 280/33.993; 280/33.991; 280/33.992; 280/DIG. 4
(58) Field of Search ...................... 280/33.991, 33.992, 280/33.993, 639, DIG. 4; 297/188.01; 211/74, 90.03; 108/25, 26

(56) References Cited

U.S. PATENT DOCUMENTS

| | | | |
|---|---|---|---|
| 595,394 A | * 12/1897 | Knoblough | 296/67 |
| 1,947,932 A | * 2/1934 | Fante | 211/85.4 |
| 2,763,413 A | * 9/1956 | Felton | 224/411 |
| 2,970,845 A | * 2/1961 | Thompson | 280/33.993 |
| 2,998,978 A | * 9/1961 | Sides | 280/33.993 |
| 3,858,835 A | * 1/1975 | Baren | 248/94 |
| 3,955,682 A | * 5/1976 | Baren | 211/74 |
| 3,955,683 A | * 5/1976 | Baren | 211/74 |
| 3,963,255 A | * 6/1976 | Trubiano | 280/33.993 |
| 4,678,195 A | * 7/1987 | Trubiano | 280/33.992 |
| 5,312,122 A | * 5/1994 | Doty | 280/33.992 |
| 5,348,323 A | * 9/1994 | Trubiano | 280/33.993 |
| 5,362,077 A | * 11/1994 | Adamson | 280/33.992 |
| 5,401,042 A | * 3/1995 | Ruger | 280/33.997 |
| 5,435,582 A | * 7/1995 | Davidson | 280/33.992 |
| 5,494,306 A | 2/1996 | Adamson et al. | |
| 5,494,308 A | * 2/1996 | Southerland | 280/33.992 |
| 5,630,599 A | * 5/1997 | Adamson et al. | 280/33.993 |
| 5,938,091 A | 8/1999 | Bergin et al. | |
| 6,231,058 B1 | 5/2001 | Kimbrough et al. | |
| 6,641,147 B2 | * 11/2003 | Werner | 280/33.991 |
| 6,644,524 B1 | * 11/2003 | Garvin | 224/411 |

FOREIGN PATENT DOCUMENTS

EP 1065129 A1 * 1/2001 ............. B62B/3/18

* cited by examiner

Primary Examiner—Bryan Fischmann
Assistant Examiner—Kelly E Campbell
(74) Attorney, Agent, or Firm—Wood, Phillips, Katz, Clark & Mortimer

(57) ABSTRACT

In a shopping cart comprising a rear gate, which has two leg openings, and a child seat, which comprises a seat base, a seat back, and a seat panel, the seat base includes a cupholder, which is covered when the seat panel is pivoted to a position wherein the seat panel covers the seat base but not when the seat panel is pivoted to a position wherein the seat panel rests against the rear gate and covers the leg openings.

5 Claims, 5 Drawing Sheets

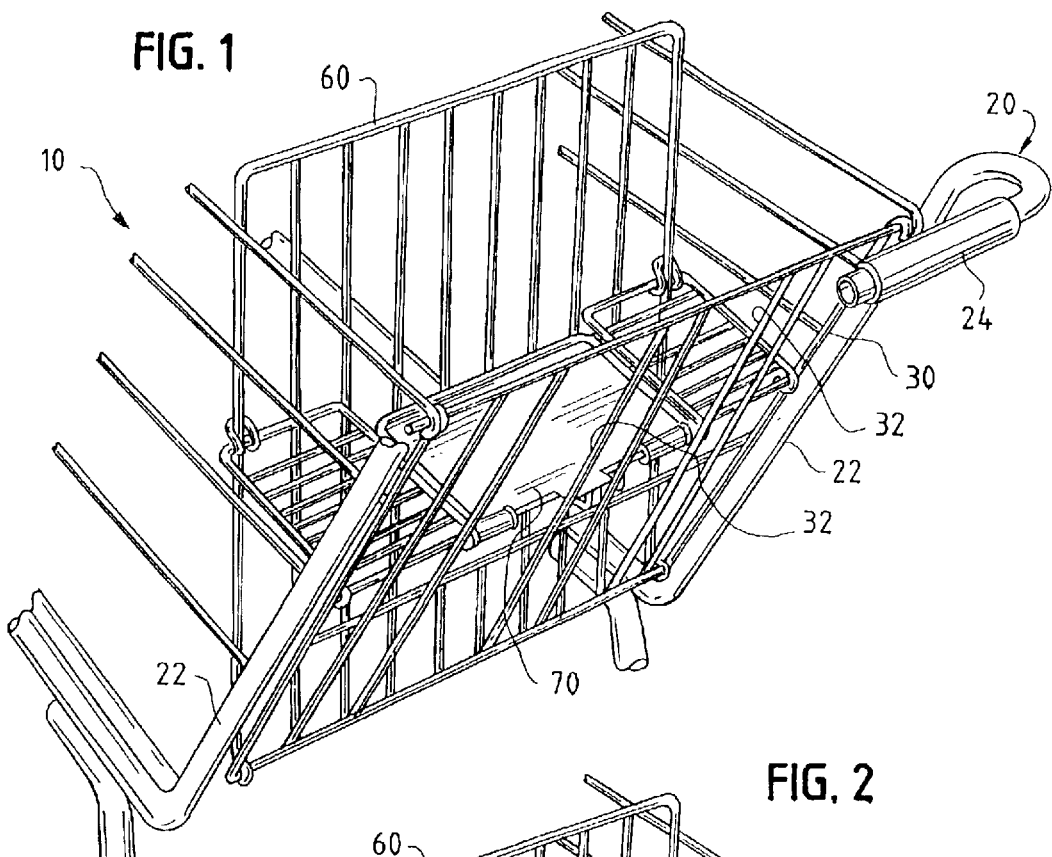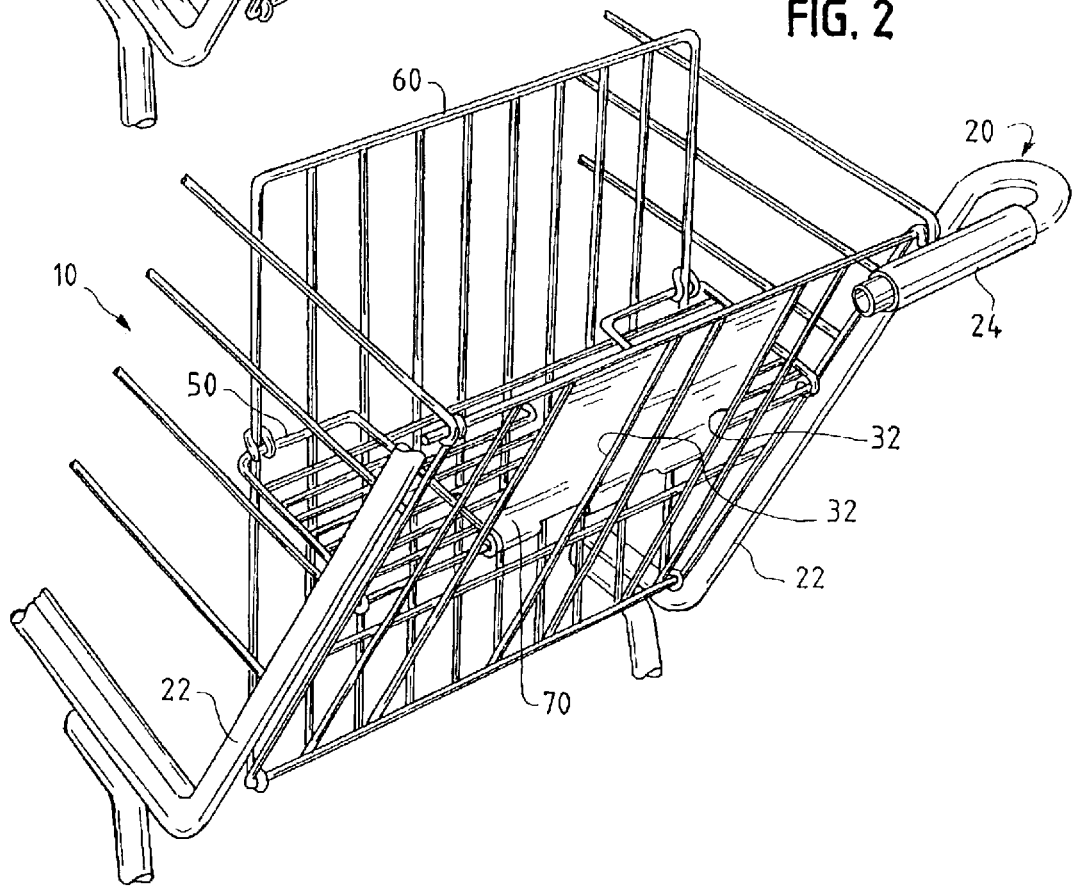

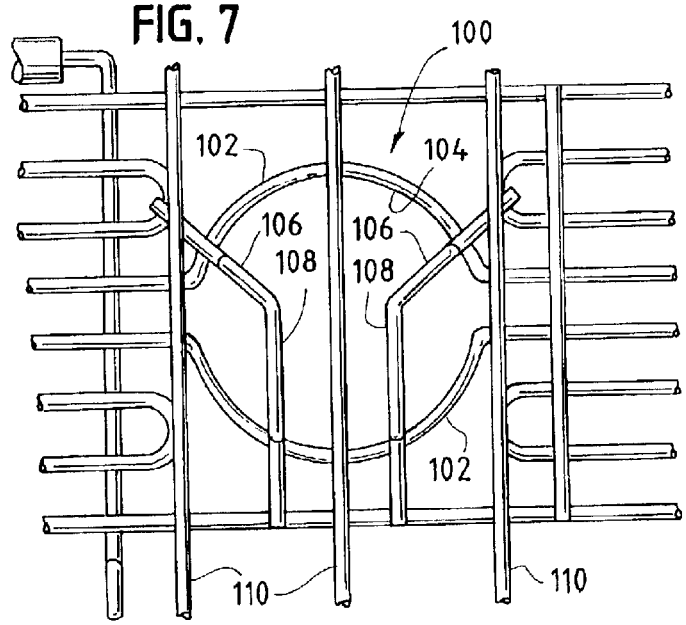
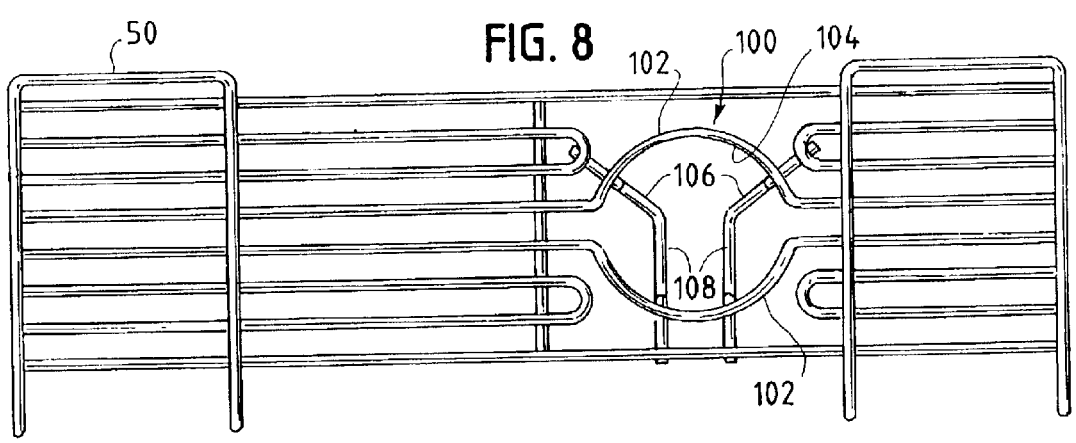
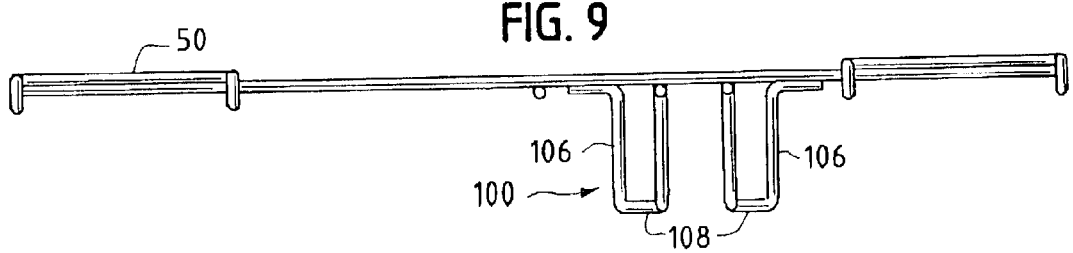
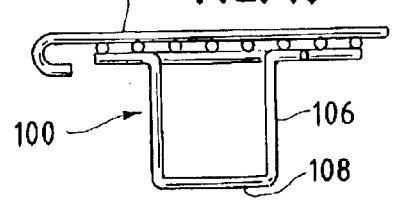

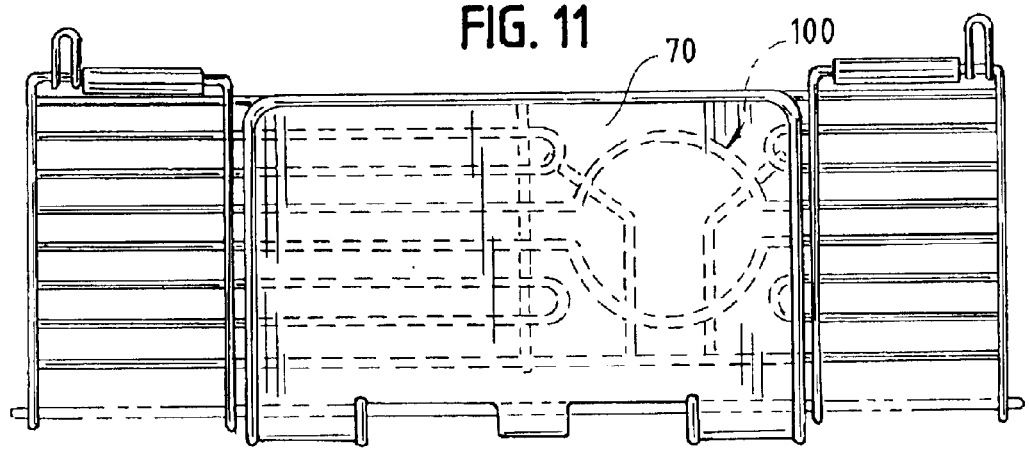
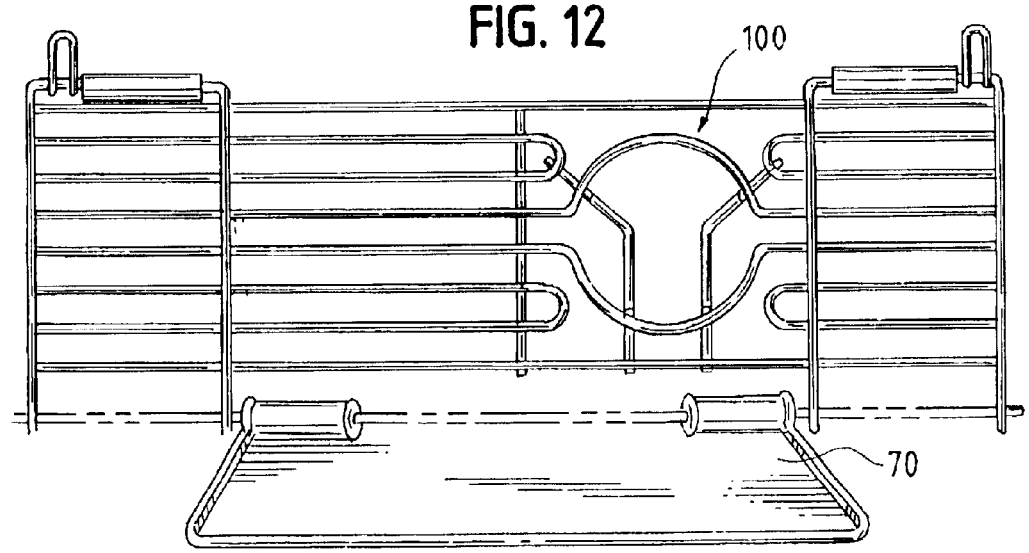
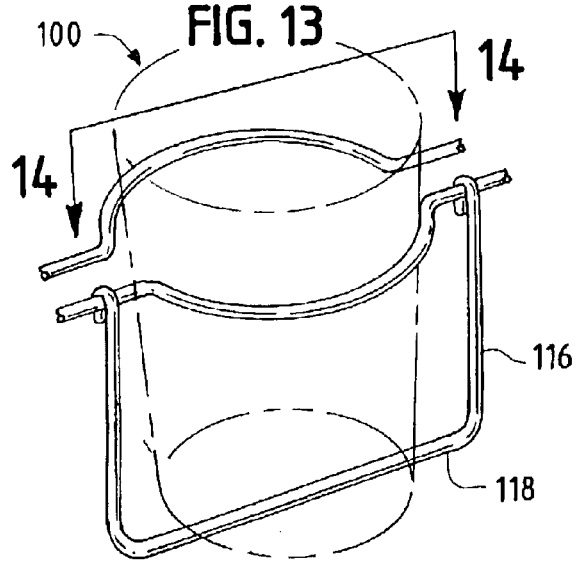
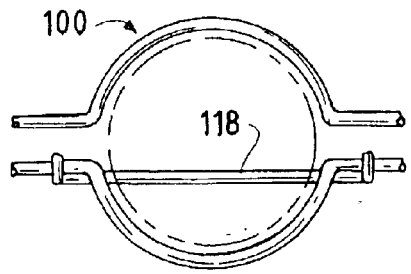

SHOPPING CART HAVING CUPHOLDER IN SEAT BASE

TECHNICAL FIELD OF THE INVENTION

This invention pertains to a shopping cart provided with a cupholder, which is located in a novel location, in a seat base of a child seat having two leg openings, which are defined by a rear gate. This invention contemplates that the cupholder is covered when a seat panel of the child seat covers the seat base but not when the seat panel blocks the leg openings.

BACKGROUND OF THE INVENTION

Commonly, a shopping cart is equipped with a cupholder, which is adapted to hold a cup of water, tea or coffee, or a carbonated beverage. As exemplified in U.S. Pat. No. 5,362,077 and U.S. Pat. No. 5,494,306, it is known to mount a cupholder to a transverse handle of a shopping cart. As exemplified in U.S. Pat. No. 5,938,091 and U.S. Pat. No. 6,231,058, it is known to mount a cupholder so as to project into a shopping cart.

SUMMARY OF THE INVENTION

This invention provides a cupholder for a shopping cart comprising a handle structure, which includes two handle uprights, a rear gate, which may be made from welded wires and which is mounted to the handle uprights so as to be pivotable between a lowered position for usage of the shopping cart and a raised position for nesting of a similar cart into the shopping cart, and a child seat, for which the rear gate has two leg openings.

The child seat comprises a seat base, which may be made from welded wires, a seat back, which may be made from welded wires, and a seat panel, which may be imperforate. Broadly, the child seat comprises a seat base, a seat back, and a seat panel and, as contemplated by this invention, the seat base includes a cupholder, the seat panel being movable between a covering position wherein the seat panel covers the seat base but does not block the leg openings and a blocking position where the seat panel does not cover the seat base but blocks the leg openings, and the seat base including a cupholder, which is covered by the seat panel when the seat panel is moved to the covering position but not when the seat panel is moved to the blocking position.

Preferably, the seat base is mounted to the rear gate so as to be pivotable, when the rear gate is pivoted to the lowered position, between a usage position and a storage position. In the storage position, the seat base projects frontwardly from the rear gate, below the leg openings. Preferably, the seat back is mounted to the rear gate so as to be pivotable conjointly with the seat base, when the rear gate is pivoted to the lowered position, between a pivoted position corresponding to the usage position of the seat base, away from the rear gate, and a pivoted position corresponding to the storage position of the seat base, toward the rear gate. Preferably, the seat panel is mounted to the seat base so as to be pivotable, when the rear gate is pivoted to the lowered position between a covering position wherein the seat panel projects frontwardly and covers the seat base and a blocking position wherein the seat panel rests against the rear gate and blocks the leg opening.

Preferably, the seat base comprises welded wires, which include one or more wires of the cupholder, the one or more wires projecting downwardly when the seat base is pivoted to the usage position. Preferably, moreover, the seat back comprises welded wires, between two of which each of the one or more wires of the cupholder is adapted to pass. Alternatively, the seat base comprises welded wires, to certain of which one or more wires of the cupholder is or are attached pivotably so as to project downwardly when the seat base is pivoted to the usage position. Preferably, the seat panel is imperforate, at least where the seat panel covers the cupholder when the seat panel is pivoted to the covering position.

BRIEF DESCRIPTION OF THE DRAWINGS

FIGS. 1, 2, and 3 are fragmentary, perspective views of a child seat of a shopping cart equipped with a cupholder according to this invention.

In FIG. 1, the child seat is arranged for a child to occupy the child seat.

In FIG. 2, the child seat is arranged for the cupholder to receive a cup. The cupholder is not illustrated in FIGS. 1 and 2.

FIG. 3, on a larger scale compared to FIGS. 1 and 2, is a view corresponding to FIG. 2 but having a seat panel broken away to illustrate the cupholder.

FIG. 7, on a larger scale compared to prior views, is a fragmentary, lower plan of the seat base, in which the cupholder is located.

FIGS. 8, 9, and 10, on a smaller scale compared to FIG. 7, are, respectively, an upper plan, a rear elevation, and a lateral elevation of the seat base, in which the cupholder is located.

FIGS. 11 and 12 are similar plans illustrating a seat panel, respectively, in a covering position wherein the seat panel covers the cupholder and in a blocking position wherein the seat panel covers two leg openings, which are illustrated in FIG. 1.

FIG. 13 is a fragmentary, perspective detail of a cupholder constituting an alternative embodiment of this invention. A cup, which is held by the cupholder, is illustrated in broken lines.

FIG. 14 is a fragmentary plan of the cupholder illustrated in FIG. 13.

DETAILED DESCRIPTION OF THE ILLUSTRATED EMBODIMENTS

Figure 3:
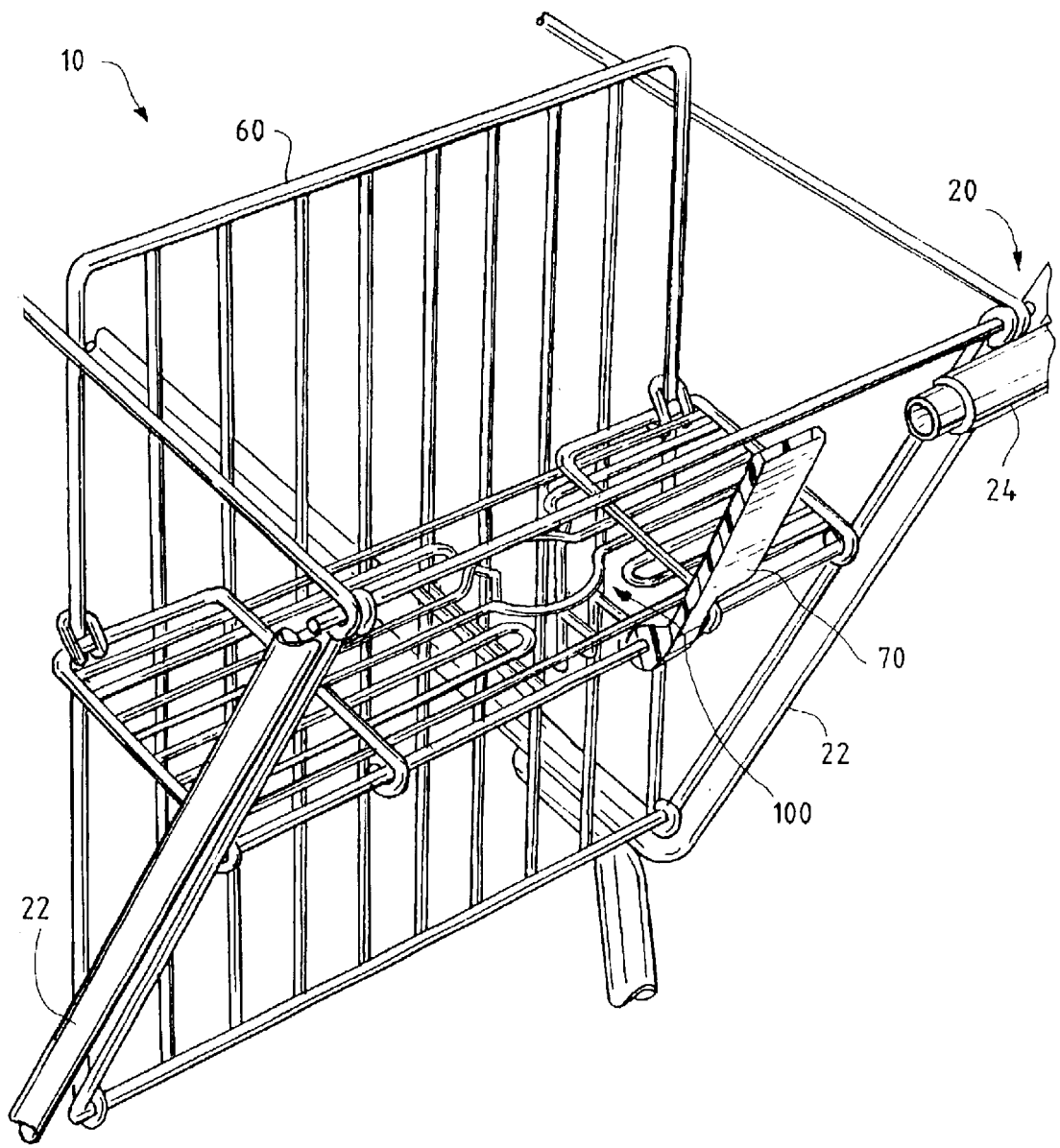

As illustrated in FIGS. 1, 2, and 3, a shopping cart 10, which is illustrated fragmentarily, comprises, along with other elements known heretofore and along with a cupholder 100 to be later described, a handle structure 20, which includes two handle uprights 22 and a transverse handle 24 connected between the handle uprights 22, a rear gate 30, and a child seat 40. Except as illustrated and described herein, the shopping cart 10 is similar to shopping carts known heretofore. Hence, other structural or functional details of the shopping cart 10 can be readily supplied by persons skilled in the art.

Figure 6:
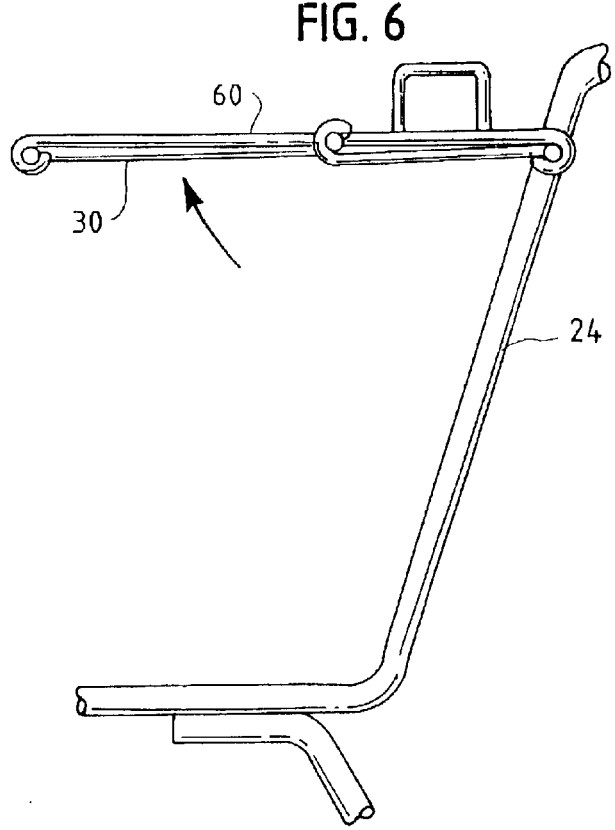
FIG. 6 is a simplified, fragmentary, lateral elevation of the shopping cart with its rear gate pivoted to a raised position and with its child seat folded accordingly.

The rear gate 30, which is made from welded wires, is mounted to the handle structure 20, in a known manner, so as to be pivotable between a lowered position, as illustrated in FIGS. 1, 2, 3, and 4, for usage of the shopping cart 10, and a raised position, as illustrated in FIG. 6, for nesting of a similar cart into the shopping cart 10. The rear gate 30 includes two leg openings 32 for the child seat 40.

The child seat 40, which except for the cupholder 100 to be later described is similar to known cupholders and which is foldable for storage and unfoldable for usage, in a known manner, as child seats known heretofore are foldable and unfoldable, comprises a seat base 50, which is made from welded wires, a seat back 60, and a seat panel 70, which is imperforate, except where mounted, and which is molded from an engineering polymer, such as polypropylene or high density polyethylene.

The seat base 50 is mounted to the rear gate 30, in a known manner, so as to be pivotable between a usage position, as illustrated in FIGS. 1, 2, 3 and 4, wherein the seat base 50 projects frontwardly from the rear gate 30 and a storage position wherein the seat base 50 bears against the rear gate 30. The seat back 60 is mounted to the rear gate 30, in a known manner, so as to be pivotable conjointly with the seat base 50, when the rear gate 30 is pivoted to the lowered position, between a pivoted position corresponding to the usage position of the seat base 50, away from the rear gate 30, as illustrated in FIGS. 1, 2, 3, and 4, and a pivoted position corresponding to the storage position of the seat base 50, toward the rear gate 30. The seat panel 70 is mounted to the seat base 50, in known manner, so as to be pivotable, when the rear gate 30 is pivoted to the lowered position, between a covering position, as illustrated in FIG. 1, wherein the seat panel 70 covers the seat base 50 and a blocking position, as illustrated in FIGS. 2 and 3, wherein the seat panel 70 blocks the leg openings 32.

Figure 4:
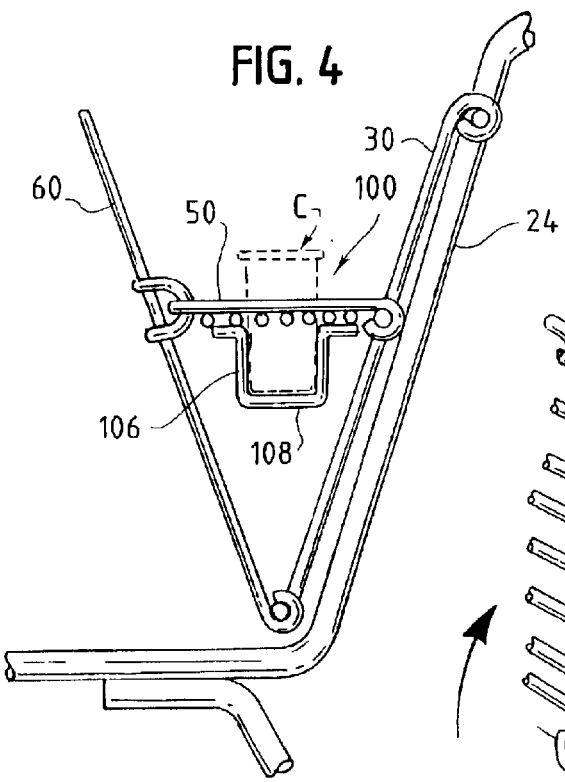
FIG. 4 is a simplified, fragmentary, lateral elevation of the shopping cart with its rear gate pivoted to a lowered position and with its child seat arranged for the cupholder to receive a cup, which is suggested in broken lines.
Figure 5:
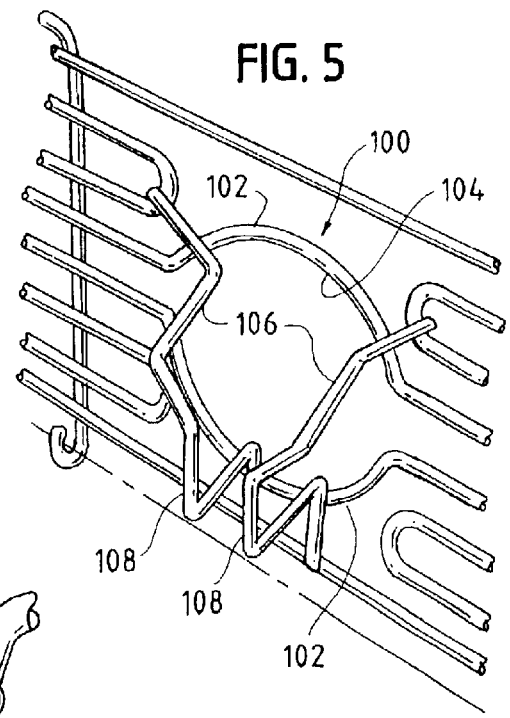
FIG. 5 is a fragmentary, perspective view of a seat base, in which the cupholder is located, in a changed position between its position in FIG. 4 and its position in FIG. 6.

In a preferred embodiment illustrated in FIGS. 3, 4, and 5, the cupholder 100 comprises, among welded wires of the seat base 50, two spaced wires 102, which are curved so as to define a generally circular aperture 104, and two spaced wires 106, which are shaped so as to project downwardly, when the seat base 50 is pivoted to its usage position, and so as to define two lower supports 108 for a cup C held by the cupholder 100. If the cup C is frusto-conical, the cup C may not reach downwardly to the lower supports 108 but may be merely supported by the spaced wires 102, at the generally circular aperture 104. Each of the spaced wires 106 is adapted, because of its shape, to pass between two spaced wires 110, among welded wires of the seat back 60, when the child seat 40 is folded. In an alternative embodiment not illustrated, a single wire 106, as illustrated and described herein, is utilized, the other wire 106 being omitted.

In an alternative embodiment illustrated in FIGS. 13 and 14, the spaced wires 106 are omitted but a single wire 116 is attached pivotably to one of the spaced wires 102 so as to project downwardly, when the seat base 50 is pivoted to its usage position, and so as to define a lower support 118 for a cup C held by the cupholder 100. Being pivotable, the single wire 116 can pivot so as not to interfere with folding of the child seat. In an alternative embodiment not illustrated, such a wire 116 is attached similarly to each of the spaced wires 102.

As a practical matter, when the seat panel 70 covers the seat base 50, as discussed above, the seat base 70 covers the cupholder 100, so as to prevent a cup from being inserted into the cupholder 100. However, as the seat panel 70 does not block the leg openings 32 of the rear gate 30, a child can be properly seated in the child seat 40. As a practical matter, when the seat panel 70 blocks the leg openings 32 of the rear gate 30, a child cannot be properly seated in the child seat 40. However, as the seat panel 70 does not cover the cupholder 100, the cupholder 100 can be then used to hold a cup.

What is claimed is:

1. A shopping cart comprising a handle structure, which includes two handle uprights, a rear gate, which is mounted to the handle uprights so as to be pivotable between a lowered position for usage of the shopping cart and a raised position for nesting of a similar cart into the shopping cart, and a child seat, for which the rear gate has two leg openings, wherein the child seat comprises a seat base, which is mounted to the rear gate so as to be pivotable, when the rear gate is pivoted to the lowered position, between a usage position and a storage position, wherein the seat base projects, in the usage position, frontwardly from the rear gate, below the leg openings, a seat back, which is mounted to the rear gate so as to be pivotable conjointly with the seat base, when the rear gate is pivoted to the lowered position, between a pivoted position away from the rear gate and a pivoted position toward the rear gate, and a seat panel, which is mounted to the seat base so as to be pivotable, when the rear gate is pivoted to the lowered position, when the seat base is pivoted to the usage position of the seat base, and when the seat back is pivoted to the pivoted position of the seat back away from the rear gate, between a covering position wherein the seat panel projects frontwardly and covers the seat base and a blocking position wherein the seat panel rests against the rear gate and blocks the leg openings, and wherein the seat base includes a cupholder, which is covered by the seat panel when the seat panel is pivoted to the covering position but not when the seat panel is pivoted to the blocking position, wherein the seat base comprises welded wires, which include one or more wires of the cupholder, the one or more wires of the cupholder projecting downwardly when the seat base is pivoted to the usage position, and wherein the seat back comprises welded wires, between two of which each of the one or more wires of the cupholder is adapted to pass.

2. A shopping cart comprising a handle structure, which includes two handle uprights, a rear gate, which is mounted to the handle uprights so as to be pivotable between a lowered position for usage of the shopping cart and a raised position for nesting of a similar cart into the shopping cart, and a child seat, for which the rear gate has two leg openings, wherein the child seat comprises a seat base, which is mounted to the rear gate so as to be pivotable, when the rear gate is pivoted to the lowered position, between a usage position and a storage position, wherein the seat base projects, in the usage position, frontwardly from the rear gate, below the leg openings, a seat back, which is mounted to the rear gate so as to be pivotable conjointly with the seat base, when the rear gate is pivoted to the lowered position, between a pivoted position away from the rear gate and a pivoted position toward the rear gate, and a seat panel, which is mounted to the seat base so as to be pivotable, when the rear gate is pivoted to the lowered position, when the base is pivoted to the usage position of the seat base, and when the seat back is pivoted to the pivoted position of the seat back away from the rear gate, between a covering position wherein the seat panel projects frontwardly and covers the seat base and a blocking position wherein the seat panel rests against the rear gate and blocks the leg openings, and wherein the seat base includes a cupholder, which is covered the seat panel when the seat panel is pivoted to the covering position but not when the seat panel is pivoted to the blocking position, wherein the seat base comprises welded wires, which include one or more wires of the cupholder, the one or more wires of the cupholder projecting downwardly when seat base is pivoted to the usage position, and wherein the seat back comprises welded wires, between two of which each of the one or more wires of the cupholder is adapted to pass, wherein the seat base comprises welded wires, which include two spaced wires of the cupholder, the spaced wires projecting downwardly when the seat base is pivoted to the usage position.

3. A shopping cart comprising a handle structure, which includes two handle uprights, a rear gate, which is mounted to the handle uprights so as to be pivotable between a lowered position for usage of the shopping cart and a raised position for nesting of a similar cart into the shopping cart, and a child seat, for which the rear gate has two leg openings, wherein the child seat comprises a seat base, which is mounted to the rear gate so as to be pivotable, when the rear gate is pivoted to the lowered position, between a usage position and a storage position, wherein the seat base projects, in the usage position, frontwardly from the rear gate, below the leg openings, a seat back, which is mounted to the rear gate so as to be pivotable conjointly with the seat base, when the rear gate is pivoted to the lowered position and when the seat base is pivoted to its usage position, between a pivoted position of the seat back away from the rear gate and a pivoted position of the seat back toward the rear gate, and a seat panel, which is mounted to the seat base so as to be pivotable, when the rear gate is pivoted to the lowered position, when the seat base is pivoted to the usage position of the seat base, and when the seat back is pivoted to the pivoted position of the seat back away from the rear gate, between a covering position wherein the seat panel projects frontwardly and covers the seats base and a blocking position wherein the seat panel rests against the rear gate and blocks the leg openings, and wherein the seat base includes a cupholder, which is covered by the seat panel when the seat panel is pivoted to the covering position but not when the seat panel is pivoted to the blocking position, wherein the seat base comprises welded wires, which include one or more wires of the cupholder, the one or more wires of the cupholder projecting downwardly when the seat base is pivoted to the usage position, and wherein the seat back comprises welded wires, between two of which each of the spaced wires of the cupholder is adapted to pass.

4. A shopping cart comprising a handle structure, which includes two handle uprights, a rear gate, which is mounted to the handle uprights so as to be pivotable between a lowered position for usage of the shopping cart and a raised position for nesting of a similar cart into the shopping cart, and a child seat, for which the rear gate has two leg openings, wherein the child seat comprises a seat base, which is mounted to the rear gate so as to be pivotable, when the rear gate is pivoted to the lowered position between a usage position and a storage position, wherein the seat base projects, in the usage position, frontwardly from the rear sate, below the leg openings, a seat back, which is mounted to the rear gate so as to be pivotable conjointly with the seat base, when the rear gate is pivoted to the lowered position, when the seat base is pivoted to its usage position, and when the seat back is pivoted to its pivoted position, between a pivoted position of the seat back away from the rear gate and a pivoted position of the seat back toward the rear gate, and a seat panel, which is mounted to the seat base so as to be pivotable, when the rear gate is pivoted to the lowered position, when the seat base is pivoted to the usage position of the seat base, and when the seat back is pivoted to the pivoted position of the seat back away from the rear gate, between a covering position wherein the seat panel projects frontwardly and covers the seat base and a blocking position wherein the seat panel rests against the rear gate and blocks the leg openings, and wherein the seat base includes a cupholder, which is covered by the seat panel when the seat panel is pivoted to the covering position but not when the seat panel is pivoted to the blocking position, wherein the seat base comprises welded wires, which include one or more wires of the cupholder, the one or more wires of the cupholder projecting downwardly when the seat base is pivoted to the usage position, and wherein the seat base comprises welded wires, to certain of which a single wire of the cupholder is attached pivotably so as to project downwardly when the seat base is pivoted to the usage position.

5. The shopping cart of claim 1, 2, 3, or 4, wherein the seat panel is imperforate, at least where the seat panel covers the cupholder when the seat panel is pivoted to the covering position.

* * * * *